Jan. 12, 1960 J. B. RESWICK ET AL 2,920,924
AIRPLANE BRAKE CONTROL
Filed June 17, 1957 2 Sheets-Sheet 1

INVENTORS
JAMES B. RESWICK
ALLISON R. WILLIAMS
BY Cameron, Kerkam & Sutton
ATTORNEYS Jan. 12, 1960  J. B. RESWICK ET AL  2,920,924
AIRPLANE BRAKE CONTROL
Filed June 17, 1957  2 Sheets-Sheet 2

INVENTORS
JAMES B. RESWICK
ALLISON R. WILLIAMS
BY Cameron, Kerkam & Sutton
ATTORNEYS

United States Patent Office 2,920,924
Patented Jan. 12, 1960

2,920,924

AIRPLANE BRAKE CONTROL

James B. Reswick, Newton, Mass., and Allison R. Williams, Vicksburg, Miss.; said Reswick assignor to said Williams Application June 17, 1957, Serial No. 665,969

10 Claims. (Cl. 303—24)

This invention relates to means for controlling the acceleration of a rotating body by an absolute value comparison of the rate of change of its angular velocity (i.e., its actual angular acceleration) with the rate of change of its linear velocity (i.e., its linear acceleration).

The invention will be described hereinafter with particular reference to the control of the braking effort applied to aircraft landing wheels so as to minimize or prevent locking of a wheel and consequent skidding rather than rolling contact of the tire with the runway surface. It has been proposed heretofore to control airplane wheel braking by an inertia member rotating with or driven from part of the wheel itself. The inertia member is usually held in a neutral position relative to the wheel (i.e., rotating therewith) by suitable friction means, springs, or the like, but is angularly displaced relative to the wheel when the acceleration of the wheel increases beyond a predetermined value empirically set depending on the friction or spring setting. This degree of overrun of the inertia member is utilized to close an electric circuit and to energize means whereby the braking effort is temporarily relieved, partially or wholly. In such systems, the overrun of the inertia member for any spring setting is a function of the actual angular acceleration of the wheel.

Prior Patent No. 2,529,885, granted November 14, 1950, discloses a more accurate brake control system in which the actual angular acceleration of the wheel is compared with the linear acceleration of the wheel. The application of the brakes results in an acceleration of the forward movement of a moving vehicle such as an airplane, or in other words a linear acceleration of the vehicle body. As long as the vehicle body and wheels are so connected that no relative linear movement takes place between them, the wheels will of course have the same linear acceleration as the vehicle body. In some cases, however, as in the case of aircraft where the landing gear struts are in effect vertical cantilever beams, or where the wheel suspension is resilient or somewhat flexible, the wheel may have linear movement relative to the body due for example to rearward deflection of the struts on landing or yielding of the resilient suspension. Under such circumstances the actual linear acceleration of the wheel differs from that of the vehicle body, and the references hereinafter to linear acceleration should be understood to refer to that of the wheel itself where different from that of the vehicle body.

Assuming that the vehicle wheel maintains the ideal conditions of complete rolling contact with the supporting surface without slippage, the linear acceleration and change of linear velocity of the wheel must be accompanied by corresponding and directly proportional angular acceleration and change of angular velocity of the wheel. Thus it will be seen that the linear acceleration of the wheel provides an accurate standard of reference against which the actual angular acceleration of the wheel can be compared to determine how closely its actual performance approaches the ideal.

In practice under some combinations of circumstances the simpler control first mentioned is reasonably satisfactory, but under others it falls short of what is desired. In landing airplanes, for example, the landing roll has lengthened to the point where maximum braking is needed, yet the skid problem has become greater at the same time. In landing, wheel load conditions vary from little or no contact to full aircraft weight and the optimum brake pressure varies over a correspondingly wide range. The problem is further complicated by wheel bounce, crosswind landings where one or more wheels may be off the ground for considerable distances, wet or icy runways, etc. Even under normal or ideal conditions, much less under such widely varying conditions, the wheels themselves cannot be relied upon as a reference for adequate control of the braking effect thereon for slip control.

In the usual fluid pressure brake system, the braking effect is easily controllable by regulating the brake-operating pressure. Thus a suitable valve can be installed in the brake pressure line and operated either electrically or mechanically to relieve the brake pressure. The valve in turn can be operated in response to an absolute value comparison between the angular overrun of an inertia flywheel, or in other words its angular displacement relative to the wheel, and the linear acceleration of the wheel as determined by a linear accelerometer of any suitable type, preferably a seismic mass.

The comparison can be effected in various ways. For example, the prior patent mentioned above discloses the comparison of electromagnetic forces proportional respectively to the angular acceleration and the linear acceleration of the wheel. The present invention relates particularly to devices in which mechanical forces or movements are compared. Thus where the movements of the two inertia devices are resiliently opposed, the two devices may be connected mechanically so as to apply the resultant of two opposing forces to the valve which accordingly moves only when one force exceeds the other, and to an extent to reduce brake pressure to the desired amount. In other cases the movements of the two inertia devices may be used to cause normally corresponding linear displacements of two elements one of which may overtake the other when the movement of its inertia device exceeds that of the other inertia device. The resulting coincidence of said elements may be utilized for example to close an electric valve-operating circuit.

Several embodiments of the invention are illustrated in the accompanying drawings but it is to be expressly understood that said drawings are for purposes of illustration only and are not to be construed as a definition of the limits of the invention, reference being had to the appended claims for this purpose.

It will be understood that in angular accelerometers embodying the invention the inertia member is preferably small and light weight and is mounted coaxially with the wheel itself. Also the linear accelerometer, where used, is preferably carried by the wheel axle itself so as to be responsive to the actual linear acceleration of the wheel itself. Many conventional landing wheel constructions employ hollow non-rotating axles on which the wheels are rotatably mounted and such tubular axles provide convenient mountings and housings for the control elements of the invention. For convenience, the drawings show installations of this type, but it will be understood that any other suitable structural arrangement can be employed.

Figure 1:
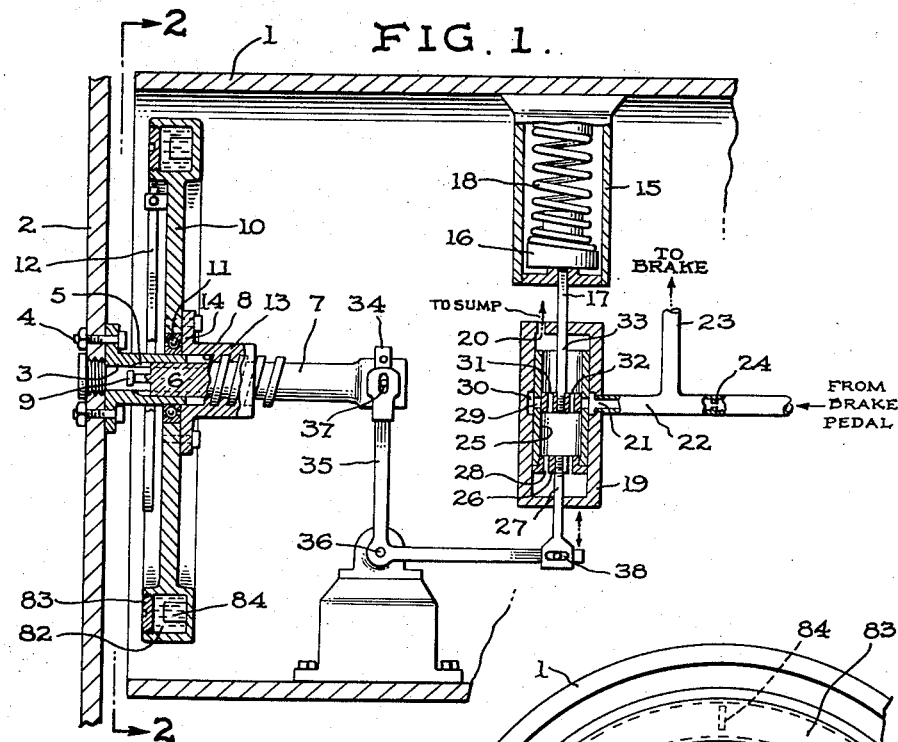
Fig. 1 is a plan view and Fig. 2 is an end view on the line 2—2 of Fig. 1 of an angular accelerometer device in combination with a linear accelerometer device and valve means for comparing the movements of elements in response to the two accelerometers.
Figure 2:
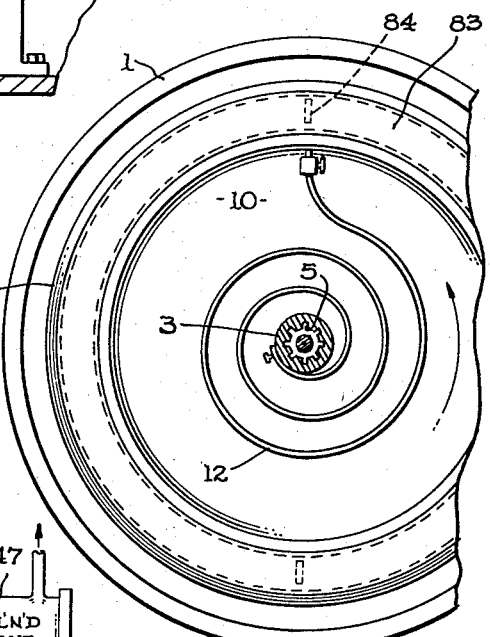

Figs. 1 and 2 illustrate types of angular and linear accelerometer devices which can be used to control the wheel brakes as described above. In this embodiment the hollow non-rotating wheel axle 1 and the rotating spider 2 of the wheel are of conventional construction. A hollow stub shaft 3 is secured to the spider by means of bolts 4, said shaft being internally splined at 5 to receive the exteriorly splined end 6 of a longitudinally movable screw shaft 7. A shoulder 8 at the end of the screw thread limits the longitudinal movement of the screw shaft by engagement with the end of the stub shaft 3, and a piston-like extension 9 of the screw shaft may be provided for dashpot action in the hollow stub shaft. The inertia member 10 rotates on a bearing 11 mounted on the end of the stub shaft 3, said inertia member being connected with said stub shaft by a spring 12. A nut 13 on the screw shaft 7 is connected with the inertia member for rotation therewith, said nut preferably having a flange 14 secured to the face of the inertia member.

It will be seen that as long as the spider 2 (i.e., the airplane wheel) and the inertia member are rotating at the same speed, there is no relative rotation between the screw shaft 7 and the nut 13, but whenever the inertia member overruns the wheel, overcoming the spring 12, there will be relative rotation between the nut and screw shaft and the latter will move longitudinally to the left as seen in the drawings.

Fig. 1 also shows a suitable type of linear accelerometer comprising a casing 15 mounted in the hollow axle 1 with its axis in a horizontal position extending in the fore and aft direction of movement of the airplane wheel. Inside the casing is a seismic mass 16 mounted to move longitudinally in the casing with its rod 17 against the compression spring 18. As the forward movement of the airplane accelerates, therefore, the seismic mass 16 will move ahead in the casing 15 and compress the spring 18 to an extent depending on the linear acceleration of the wheel.

Figs. 1 and 2 show a control system of the type mentioned above wherein the absolute value comparison is made mechanically between the relative movement of two mechanical elements, the movement of one element being responsive to and in proportion to the actual angular acceleration and the movement of the other element being responsive to and in proportion to the linear acceleration. As long as the accelerations are equivalent, said elements may move together (i.e., in the same direction and to the same extent), but if the angular acceleration becomes excessive, the movement of the corresponding element will increase relative to the other element and the consequent displacement of one element relative to the other actuates suitable brake pressure regulating means.

In the embodiment of Figs. 1 and 2, the aforesaid relative movement takes place between the parts of a bypass valve in the brake pressure line. This valve comprises a casing 19 having an outlet 20 connected to the sump and an inlet 21 connected by the bypass line 22 to the brake pressure line 23. The flow of the pressure fluid in this line is preferably metered by a suitable orifice 24.

Inside the case 19 is a longitudinally movable sleeve 25 open at one end and having a head 26 at its other end that carries an actuating rod 27 passing slidably out through the end of casing 19. The head 26 is provided with suitable through ports or ducts 28. Intermediate its ends the wall of the sleeve 25 is pierced with ports 29 which normally register with an annular groove 30 formed in the inner wall of the valve casing 19 and communicating with the inlet 21.

The ports 29 are normally closed by a piston 31 having through ports or ducts 32 and slidable within the sleeve 25 by an actuating rod 33 passing slidably out the end of the casing 19.

The movable valve parts, i.e., the sleeve 25 with its rod 27 and the piston 31 with its rod 33, are suitably connected to and moved by the angular and linear accelerometers. As shown, it is convenient to mount the piston 31 and the seismic mass 16 on the same rod. In other words, the rod 17 of the accelerometer and the rod 33 of the valve are integral extensions of each other.

The mechanism for moving the sleeve 25 may suitably comprise a collar 34 loosely mounted on the end of the screw shaft 7, a bell crank 35 pivoted at 36 on the axle, one arm having a slotted end 37 engaging a pin on the collar 34 and the other arm having a pin engaging in the slotted end 38 of the rod 27.

It will be seen that as long as the wheel spider 2 and the inertia member 10 are rotating at the same speed and there is no acceleration of the vehicle, there will be no endwise movement of the screw shaft 7 or of the inertia mass 16 of the linear accelerometer. When the brakes are applied and deceleration takes place, there will be a tendency for the rotary inertia member 10 to overrun the wheel spider 2 and also for the inertia mass 16 to move forwardly in the casing 15. As long as true rolling contact is maintained between the wheel and the runway surface, these two decelerations will be proportional to one another and the parts can be arranged and calibrated so that the sleeve 25 and piston 31 move in the same direction and to the same extent. Thus the pressure bypass remains closed until, due to slippage between the tire and runway surface or other cause, the accelerometers are no longer in balance. If the wheel decelerates more rapidly than does its linear movement, the inertia member 10 overruns the wheel spider 2 by an amount sufficient to cause the sleeve 25 to move up relative to the piston 31 enough to open the ports 29 with the result that the brake pressure is temporarily relieved. Should the linear accelerometer predominate for any reason, the same result is reached by moving the piston 31 up relative to the sleeve 25. In either case the ports 29 are closed again as soon as the accelerometers are in balance again.

Figure 3:
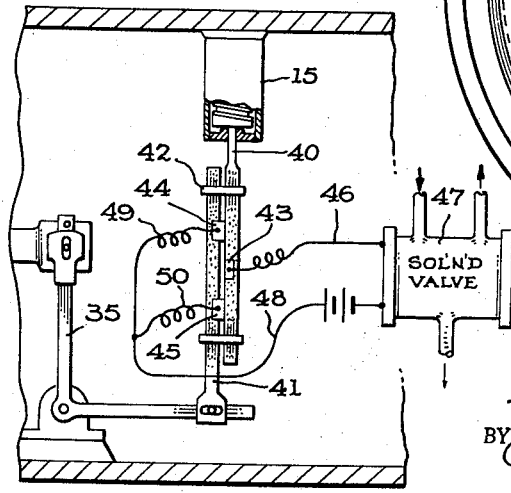
Fig. 3 is a plan view of a modified form of the device of Figs. 1 and 2 embodying movement-comparing means of a mechanically different type.

Fig. 3 shows another embodiment of the invention in which the relatively movable valve parts of Fig. 1 are replaced by relatively movable switch contacts, the result being to close an electric circuit to a solenoid-operated relief valve. As shown, the valve rods 27 and 33 are replaced by parallel contact-carrying slides 40 and 41 guided in brackets 42. The slides are moved by the angular and linear accelerometers in the same manner as the valve parts described above. One slide, in this case the slide 40, carries a contact 43 that is normally located intermediate two spaced contacts 44 and 45 carried by the other slide 41. As in the embodiment of Figs. 1 and 2, when slippage occurs the accelerometers are no longer in balance and relative movement between the slides 40 and 41 takes place in one or the other direction so that when the amount of this relative movement becomes sufficient the contact 43 will engage either the contact 44 or the contact 45. Contact 43 is connected by lead 46 to one terminal of a suitable solenoid valve 47 similar to the normally centered or closed solenoid-operated valves illustrated in Figs. 1 and 3 of our Patent No. 2,892,660. The other valve terminal is connected by lead 48 and parallel branches 49, 50 to the contacts 44, 45.

Thus as long as the accelerometers are in balance, the contacts 43, 44, 45 remain open, but if either accelerometer predominates, contact 43 will engage either contact 44 or contact 45 and close the valve energizing circuit, thus relieving the brake pressure.

Figure 4:
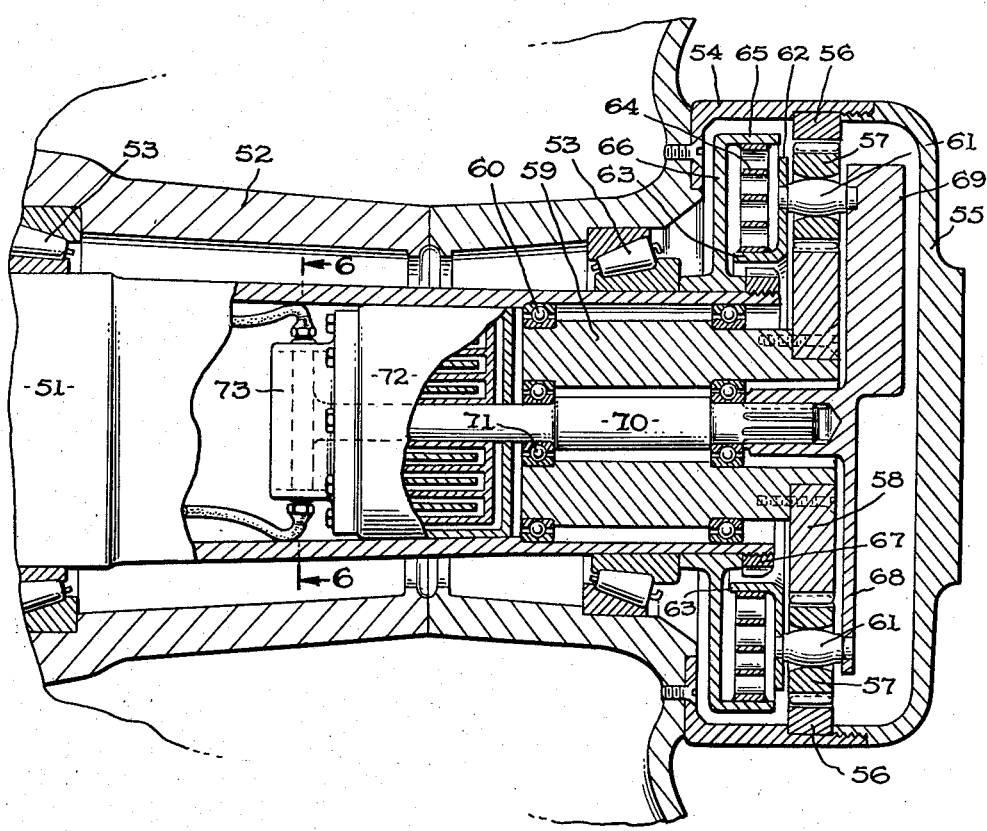
Fig. 4 shows another form of angular accelerometer device in combination with a linear accelerometer, the two accelerometers being connected so as to apply a resultant mechanical torque to a control valve.
Figure 5:
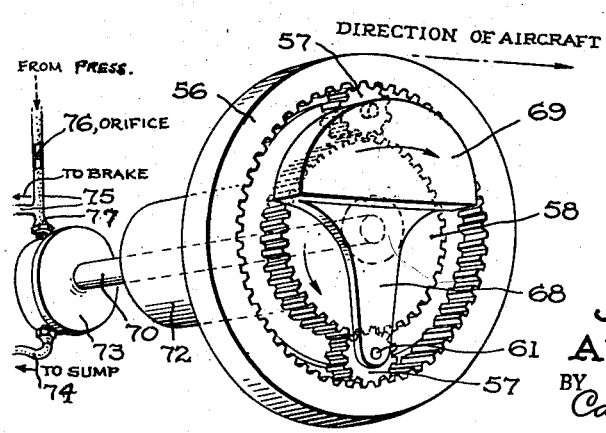
Fig. 5 is a detail perspective view of part of Fig. 4.

Figs. 4 and 5 illustrate another embodiment of the invention wherein torques responsive to and proportional to linear and angular accelerations are normally opposed and balanced, but wherein either torque when predominant will cause a movement of control means against spring action to move a valve controlling a bypass in the brake pressure line.

Referring to these figures, the non-rotating wheel axle 51 and wheel structure 52 rotating on bearings 53 can be of any suitable construction. Mounted on the wheel structure is a suitable two-part housing 54, 55 in which an internal ring gear 56 is fixed to rotate with the wheel relative to the axle. This gear 56 forms part of an epicyclic gear train comprising two or more planet gears 57 and a sun gear 58, the latter being fixed on the end of a tubular inertia member 59 rotatably mounted within the hollow end of the axle 51 by means of suitable bearings 60.

It will be seen that when the aircraft lands and the wheel rolls on the ground, and assuming the planet pinions 57 to be mounted on fixed axes, then these pinions will serve as a driving connection between the ring gear and the sun gear rotating in opposite directions. Thus if the ring gear rotates clockwise as seen in Fig. 5, the sun gear rotates counterclockwise. Upon any slowing down of the wheel, the inertia member 59 tends to overrun with the result that the planet pinions tend to revolve around the axle in a counterclockwise direction, walking around the inside of the ring gear 56.

This tendency is opposed by suitable resilient means. In the form shown, for example, the spindles 61 of the planet pinions are mounted in a cage 62 that is revolvable with said pinions around the main axle. An inturned flange 63 of the cage 62 serves to mount and secure one end of a band spring 64, the convolutions of which surround said flange. The other end of the spring is secured to the surrounding flange 65 of a spring holding member 66 secured on the axle by means of a locking ring 67.

Thus it will be seen that the inertia member 59 serves as an angular accelerometer, and that it can be balanced by a linear accelerometer arranged to create a tendency for the planet pinions to walk around inside the ring gear 56 in a clockwise direction upon linear deceleration of the wheel. As shown, a radially extending arm 68 is mounted as hereinafter described to rotate about the wheel axis, the spindles 61 of the planet pinions being mounted in opposite ends of this arm. The upper end of the arm is also enlarged at 69 to provide a mass serving as a linear accelerometer. On linear deceleration of the wheel, the mass 69 tends to move forward and the arm 68 tends to revolve clockwise about the wheel axle. As long as normal rolling contact of the wheel with the ground is maintained, the opposite deceleration torques of the inertia member 59 and of the mass 69 can be arranged to be equal and opposite insofar as movement of the planet pinions about the wheel axis is concerned.

Whenever either the angular deceleration torque or the linear torque exceeds the other, the arm 68 rotates somewhat around the wheel axis, in one or the other direction, and this rotational movement can be used to control a bypass valve in the brake pressure line. In the form shown, this is accomplished by mounting the arm 68 on an axial shaft 70 which extends through the bore of the tubular inertia member 59 and is rotatively mounted therein by bearings 71. Rotation of the shaft 70 and arm 68 may be damped if desired by means such as a rotary damper shown at 72.

Figure 6:
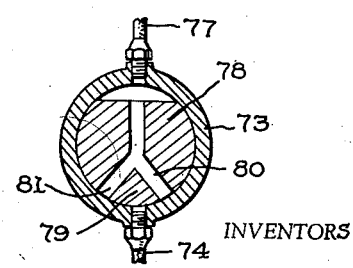
Fig. 6 is a diagrammatic detail view of the rotary valve of Fig. 4.

The shaft 70 serves to operate a rotary valve 73 of any suitable type, the valve inlet 77 being a bypass connected to the brake pressure line 75 with its orifice 76 as described above, and the outlet 74 from the valve leading to the sump (not shown). Fig. 6 illustrates diagrammatically the operation of a suitable valve. The valve plug 78 is rotatable in either direction by the shaft 70. Within a predetermined range of operation, the amount of which depends on the extent of the valve plug section 79, rotation of the valve stem 70 has no effect. Beyond this range, however, either the passage 80 or the passage 81 comes into communication with the inlet passage 77 and connects it with the outlet passage 74, thus relieving the brake pressure until the valve plug moves back toward neutral position.

Under practical conditions of operation, it will usually be desirable to damp the movement of the linear and angular accelerometers. The rotary damper 72 of Figs. 4 and 5 serves both purposes. In the case of the linear accelerometers and associated mechanisms, damping can be effected most simply by immersing the selected mechanisms in liquid. In Fig. 1, for example, the casing 15 of the linear accelerometer can be filled with a damping oil or other suitable liquid.

Similarly any suitable means, frictional or otherwise, can be used to damp the rotation of the inertia flywheel. Figs. 1 and 2 show one such means by way of example. The rim of the fly-wheel 10 is formed with a channel 82 opening to one side and extending around the rim, said channel being normally closed by an annular threaded ring member 83. At spaced points around the channel, say two, are vanes or dams 84 partially obstructing the channel but leaving a constricted opening for the passage of a damping liquid filling the channel, such as oil, mercury, etc.

The operation of the three systems shown in the drawings is substantially the same. It is known that the maximum coefficient of friction between the tire surface and the surface of the runway occurs at about 10–15% slippage, and that at about 20% slippage heating of the tire becomes excessive and shortly thereafter the tread begins to soften and melt at which point the coefficient of friction approaches zero. Any slippage will be sensed and a differential force will develop, but it is not desirable to begin to open the bypass valve in the brake pressure line and reduce brake torque unless and until slippage exceeds such a desirable amount. In Fig. 1, the bypass valve does not begin to open until the relative travel in either direction between the sleeve 25 and piston 31 is sufficient to uncover the sleeve port 29, thus providing a dead space or neutral zone on either side of the dead center position of the valve parts. Likewise in Fig. 3, a similar neutral zone or dead space is provided due to the fact that the relative travel between the slides 40 and 41 must be sufficient to bring contact 43 into engagement with either contact 44 or contact 45 before the bypass valve begins to open. In Fig. 6, also, a neutral zone or dead space is provided due to the fact that the relative travel between the valve stem 78 and the valve casing 73 is sufficient to bring the valve passage 80 or the valve passage 81 to a position of threshold opening with the passage 74.

The amount of such relative travel depends on the absolute difference between the forces proportional to angular acceleration and linear acceleration. The relatively movable parts take up a definite position which corresponds to said absolute difference between angular and linear acceleration. As long as this absolute differential force is small enough to maintain the relatively movable parts within the neutral zone or dead space corresponding to a predetermined optimum slippage, the bypass valve does not begin to open as explained above. When the above absolute differential force becomes great enough due to slippage greater than said predetermined optimum, it causes the relatively movable parts to travel to a position in which the bypass valve has opened to an extent corresponding to the magnitude of said absolute difference, thus causing a reduction in the fluid pressure to the brake from the upstream orifice. This in turn will reduce the brake torque and thus decrease slippage. As a result, the absolute difference between linear and angular accelerations is correspondingly reduced, resulting in a decrease in the above differential force and causing the bypass valve to decrease its port opening area and arresting further decrease in fluid pressure and brake torque. It is not necessary or desirable to reduce the brake pressure or brake torque to zero, but only to reduce it sufficiently to obviate excessive or undesirable slippage. Thus this limited range in the magnitude of fluid pressure changes and wheel retardation reduces to a minimum fore and aft landing gear oscillations and intermittent complete losses of braking effort which are prevalent to the extreme when a completely on-or-off type of valve is used to control the fluid pressure. The invention thus limits maximum brake torque to an optimum under all conditions, but does not interfere in any way with reduction of brake torque by the operator to zero or to any extent he desires.

While the embodiments of the invention shown in the accompanying drawings have been illustrated in detail and described with considerable particularity, it will be understood that the invention is not restricted to these embodiments but is susceptible of a variety of forms which will suggest themselves to those skilled in the art. Also various changes may be made in the form, details of construction, and arrangement of the parts without departing from the spirit of the invention. Reference is therefore to be had to the appended claims for a definition of the limits of the invention.

What is claimed is:

1. In a braking system for a wheeled vehicle having a pressure-operated brake, the combination of pressure supply means and a brake pressure line having a restricted orifice, a normally closed bypass valve connected to the brake pressure line at a point downstream with respect to said orifice and openable to relieve the brake pressure, angular accelerometer means responsive to changes in angular velocity of a wheel comprising an inertia member mounted for rotation relative to the wheel and yieldably connected with the wheel for normal rotation therewith, linear accelerometer means comprising a seismic mass mounted for movement relative to the wheel in response to changes in linear velocity of the wheel and yieldably connected with the wheel for linear movement therewith, and valve actuating means comprising parts movable relatively to one another in one direction by the aforesaid rotation of said inertia member relative to the wheel and in the opposite direction by the aforesaid movement of said seismic mass relative to the wheel, said parts having a dead-center position relative to each other and a predetermined range of movement relative to each other in either direction from said dead-center position to form a neutral zone permitting a predetermined amount of desirable slippage and throughout which said valve is closed, relative movement of said parts beyond said neutral zone as a result of an increase of slippage beyond said predetermined amount causing a gradually increasing port opening of said bypass valve to relieve pressure in said brake pressure line and reduce brake torque by an amount corresponding to said increase in slippage.

2. A braking system as defined in claim 1, said angular accelerometer means comprising a threaded member driven by said inertia member and a cooperating threaded member connected for rotation with said wheel, relative rotation between said members producing axial movement of said cooperating member, and means for transmitting said axial movement to said valve actuating means.

3. A braking system as defined in claim 2, said valve actuating means comprising a solenoid for moving said valve to open position, one of said relatively movable parts having two contacts spaced in the direction of movement, the other of said relatively movable parts having a contact the dead-center position of which is between said two spaced contacts, and a solenoid energizing circuit in which said contacts are connected so that the circuit is closed on movement of said parts relative to each other in either direction from dead-center position.

4. A braking system as defined in claim 2, said relatively movable parts being valve parts one of which has ports communicating with said bypass connection and the other of which covers said ports in said dead-center position of said parts.

5. A braking system as defined in claim 2, said valve having a substantially cylindrical casing with an inlet passage on one side communicating with said bypass connection and an outlet passage on its opposite side through which the brake pressure is relieved, one of said relatively movable parts comprising a sleeve-like member movable axially in said casing and having ports registering with said inlet and outlet passages in said dead-center position, the other of said relatively movable parts comprising a piston-like member movable axially in said sleeve-like member and covering said ports in said dead-center position.

6. A braking system as defined in claim 1, said linear accelerometer means comprising a member mounted for rotation about the wheel axis and having greater mass on one side of said axis than on the other, whereby linear acceleration of said wheel tends to cause rotation of said member about the wheel axis.

7. In a braking system as defined in claim 1, comprising a device mounted coaxially on the wheel axle and having an inertia member rotatable in the axle and gear means rotatable with the wheel and having driving engagement with said inertia member, said gear means including a pinion having planetary motion about the wheel axis in one direction in response to the driving reaction in the gear train, means resiliently opposing said planetary motion, a member mounted for rotation about the wheel axis and connected with said pinion to follow its planetary motion, said last-named member having an unbalanced mass about the wheel axis and arranged to rotate in a direction to oppose said planetary motion on linear acceleration of the wheel, and means transmitting the rotary movement of said last named member to said valve.

8. A braking system as defined in claim 7, said gear means comprising an outer ring gear driven by the wheel and a sun gear drivingly connected with said rotary inertia member, said planetary pinion meshing with said ring gear and sun gear and being revoluble therebetween about the axis of the sun gear, and a spiral spring having one end connected to the wheel axle and the other end connected to said planetary pinion for resiliently opposing its planetary motion as aforesaid.

9. A braking system as defined in claim 8, said wheel axle being hollow and having said inertia member rotatably mounted therein, said inertia member projecting from the end of said axle and having said sun gear on its projecting end, said member being tubular, and a valve actuating shaft mounted for rotation in said tubular inertia member, said unbalanced member being mounted on the end of said shaft.

10. In a braking system as defined in claim 1, said angular accelerometer means responsive to changes in angular velocity of a wheel comprising a rotatable inertia member, means connecting said member with said wheel for simultaneous rotation therewith and overrunning rotation relative thereto, linear accelerometer means comprising a seismic mass, means connecting said mass with said wheel for linear movement therewith and for movement realtive thereto in response to changes in linear velocity of said wheel, said valve comprising relatively movable parts having a dead-center relative position in which said bypass connection is closed but movable through said neutral zone to bypass opening positions on movement relative to each other in either direction from said neutral position.

References Cited in the file of this patent

UNITED STATES PATENTS

| | | |
|---|---|---|
| 2,038,145 | Cook et al. | Apr. 21, 1936 |
| 2,573,387 | Bush | Oct. 30, 1951 |
| 2,818,244 | Ropar | Dec. 31, 1957 |

OTHER REFERENCES

Hebberling et al.: German application Serial No. W14238, printed January 26, 1956 (Kl. 20f 49).